F. F. BENSON.
CANDLE HOLDER.
APPLICATION FILED MAR. 5, 1918.

1,295,679.

Patented Feb. 25, 1919.

Witnesses

Inventor
F. F. Benson
By Victor J. Evans
Attorney

UNITED STATES PATENT OFFICE.

FRED F. BENSON, OF CHINOOK, MONTANA.

CANDLE-HOLDER.

1,295,679. Specification of Letters Patent. Patented Feb. 25, 1919.

Application filed March 5, 1918. Serial No. 220,541.

*To all whom it may concern:*

Be it known that I, FRED F. BENSON, a citizen of the United States, residing at Chinook, in the county of Blaine and State of Montana, have invented new and useful Improvements in Candle-Holders, of which the following is a specification.

This invention relates to candle holders and aims to provide means for holding and suspending a lighted candle in a manner to prevent the flame from reaching any inflammable material and is especially adapted for use upon Christmas trees.

An object of the invention is to provide a device of this character in which the flame is inclosed and which consists of a tubular member having a reduced open end adapted to fit the candle, the latter extending within the tubular member which is perforated throughout its length for the admission of air to the flame and to permit of the escape of the rays of light. The closed end of the receptacle carries a projecting eye, to which is secured a hook for suspending the holder from the tree, while the open end of the receptacle is closed by a removable cap, the invention providing a simple, neat and ornamental device by means of which a lighted candle may be placed upon a tree without danger of fire.

Figure 1:
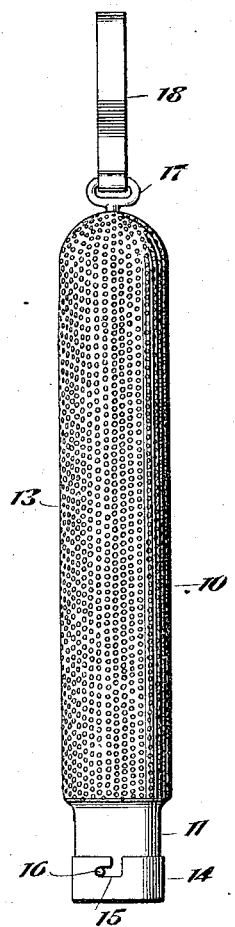
Figure 2:
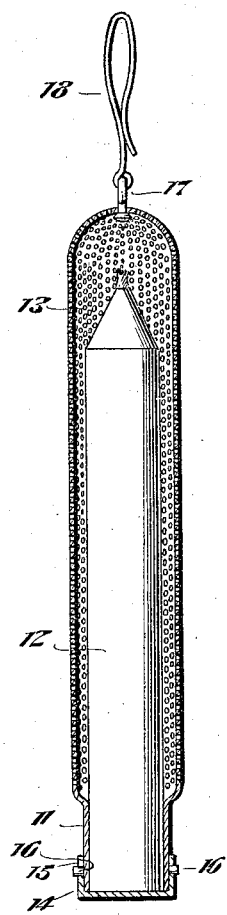

In the drawings:—Figure 1 is a side elevation of a candle holder embodying the present invention; and Fig. 2 is a longitudinal sectional form of the same showing the candle in position therein.

Referring to the drawings in detail, like characters of reference denote corresponding parts throughout the several views.

The holder comprises a tubular member 10 which is closed at one end and is provided at its opposite open end with a reduced sleeve 11, the internal diameter of which is designed to fit the candle 12. This spaces the candle from the inner wall of the tubular member so as to provide for the admission of air through perforations 13 formed in the said tubular member and to permit the ray of light to project through the said perforations substantially throughout the length of the holder. The open end of the holder is adapted to be closed by a removable cap 14, which is provided with oppositely disposed bayonet slots 15, for the reception of pins 16 carried by the sleeve 10. The opposite closed end of the tubular member 10 is preferably semi-spherical and is provided with a concentrically arranged swiveled eye 17 projecting therefrom. Pivotally secured to the eye 17 is a spring hook 18, which is adapted to engage over the branch of a tree or other support to removably suspend the holder.

As above stated, the invention provides a simple, neat and ornamental device for suspending a candle from a tree in a manner to obviate danger of fire, the light projecting through the openings 13 and forming an effective ornament for the tree.

Having described the invention, what is claimed is:—

A candle holder embodying a tubular member perforated throughout its length and closed at one end, an imperforate section of relatively small diameter located at the opposite open end of said member, said imperforate section being of substantially the same diameter as the candle, whereby the latter will, when placed within the tubular member be slightly spaced from the walls thereof to permit a circulation of air, a removable closure for the open end of the tubular member to provide a support for the candle and a hook pivotally secured to the closed end of the member.

In testimony whereof I affix my signature.

FRED F. BENSON.

Copies of this patent may be obtained for five cents each, by addressing the "Commissioner of Patents, Washington, D. C."